(12) United States Patent
Zahiri

(10) Patent No.: US 6,786,554 B1
(45) Date of Patent: Sep. 7, 2004

(54) DEVICE FOR SUPPORTING THE HEAD AND NECK OF A PASSENGER WHILE A PASSENGER IS SLEEPING IN A VEHICLE

(75) Inventor: Hormoz Zahiri, Los Angeles, CA (US)

(73) Assignee: Manouchehr Komeli, Beverly Hills, CA (US); part interest ( * ) Notice: Subject to any disclaimer, the term of this patent is extended or adjusted under 35 U.S.C. 154(b) by 0 days.

(21) Appl. No.: 10/645,711

(22) Filed: Aug. 20, 2003

(51) Int. Cl.[7] .............................................. A47C 20/02
(52) U.S. Cl. .............................. 297/393; 5/636; 5/637; 602/17; 602/18
(58) Field of Search .............................. 297/393, 397; 5/636, 637, 639; 602/17–20

(56) References Cited

U.S. PATENT DOCUMENTS

| | | | |
|---|---|---|---|
| 382,949 A | * 5/1888 | Campbell | 297/393 |
| 392,212 A | * 11/1888 | McCollum | 297/393 |
| 2,389,269 A | * 11/1945 | Mermis | 5/632 |
| 2,973,030 A | * 2/1961 | Matthewson | 297/393 |
| 2,990,008 A | * 6/1961 | Bien | 297/393 |
| 3,017,221 A | * 1/1962 | Emery | 297/397 |
| 3,156,500 A | * 11/1964 | Kerr | 297/391 |
| 3,574,397 A | 4/1971 | Norriss | |
| 4,285,081 A | 8/1981 | Price | |
| 4,345,347 A | 8/1982 | Kantor | |
| 4,550,458 A | 11/1985 | Fiore | |
| 4,708,129 A | 11/1987 | Pujals | |
| 5,220,700 A | 6/1993 | Liu | |
| 5,778,469 A | 7/1998 | Festa | |
| D412,636 S | 8/1999 | Seppo | |
| D422,830 S | 4/2000 | Cothren | |
| 6,088,855 A | 7/2000 | Connolly | |
| 6,289,538 B1 | 9/2001 | Fidge | |
| 6,308,345 B1 | * 10/2001 | Williams, Jr. | 602/17 |
| 6,457,195 B1 | 10/2002 | Holste | |
| 6,460,207 B1 | * 10/2002 | Papay et al. | 5/640 |
| D485,111 S | * 1/2004 | Keilhauer | D6/601 |

* cited by examiner

*Primary Examiner*—Peter R. Brown
(74) *Attorney, Agent, or Firm*—Thomas I. Rozsa; Tony D. Chen

(57) ABSTRACT

An apparatus to support the curve of the posterior aspect of the upper and lower portion of the neck and upper thoracic portion of the spine and behind the ears to provide support to these areas so that the head and neck will remain in a supported position while the individual is asleep. The device also provides a residing area for the skull supporting the weight of the head posteriorly. The invention holds the spine in the ideal position during sleep. The device does not support the head and neck of a passenger when awake and holding his/her head and neck in the appropriate vertical position by the supporting contraction of the muscles. In such times, the passenger's head and neck area are completely free of any uncomfortable contact with the device. The device is not strapped to the neck and does not support the head or neck interiorly. When the passenger bends forward or stands up from his/her seat, the device drops behind the shoulder area over the upper thoracic, held in place by a loose strap similar to a "cowboy hat" strap. The device is mechanically effective only when passengers place it behind their neck, lean their seat backward for 10° and relax their head to rest on the device.

7 Claims, 2 Drawing Sheets

DEVICE FOR SUPPORTING THE HEAD AND NECK OF A PASSENGER WHILE A PASSENGER IS SLEEPING IN A VEHICLE

BACKGROUND OF THE INVENTION

1. Field of the Invention

The present invention relates in general to the field of cervical support devices which are designed to support a wearer's neck. The present invention also relates to the field of devices which support a user's neck while the user is riding and/or resting in a vehicle.

2. Description of the Prior Art

There are many devices in the prior art which attempt to address the problem of supporting a user's neck while the user is riding and/or resting and/or sleeping in a vehicle. The following twelve patents are the closest prior art of which the inventor is aware:

1. U.S. Pat. No. 3,574,397 issued to Jan Norriss on Apr. 13, 1997 for "Orthopedic Pillow" (hereafter the "Jan Norriss Patent");

2. U.S. Pat. No. 4,285,081 issued to Price on Aug. 25, 1981 for "Device For Recumbency Of The Head And Neck" (hereafter the "Price Patent");

3. U.S. Pat. No. 4,345,347 issued to Kantor on Aug. 24, 1982 for "Head And Neck Support Cushions" (hereafter the "Kantor Patent");

4. U.S. Pat. No. 4,550,458 issued to Fiore on Nov. 5, 1985 for "Cervical Support Pillow" (hereafter the "Fiore Patent");

5. U.S. Pat. No. 4,708,129 issued to Pujals on Nov. 24, 1987 for "Cervical/Occipital Support" (hereafter the "Pujals Patent");

6. U.S. Pat. No. 5,220,700 issued to Liu on Jun. 22, 1993 for "Protective Pillow" (hereafter the "Liu Patent");

7. U.S. Pat. No. 5,778,469 issued to Festa on Jul. 14, 1998 for "Therapeutic Cervical Pillow" (hereafter the "Festa Patent");

8. U.S. Pat. No. Des. 412,636 issued to Seppo on Aug. 10, 1999 for "Lumbar Support" (hereafter the "Seppo Patent");

9. U.S. Pat. No. Des. 422,830 issued to Cothren on Apr. 18, 2000 for "Sleep Support Device" (hereafter the "Cothren Patent");

10. U.S. Pat. No. 6,088,855 issued to Connolly on Jul. 18, 2000 for "Cervical Neck Support For Children" (hereafter the "Connolly Patent");

11. U.S. Pat. No. 6,289,538 B1 issued to Fidge on Sep. 18, 2001 for "Variable Contour Head Support" (hereafter the "Fidge Patent");

12. U.S. Pat. No. 6,457,195 B1 issued to Holste on Oct. 1, 2002 for "Head And Neck Support" (hereafter the "Holste Patent");

The Norris Patent discloses an orthopedic pillow. adapted for use with a seat in an automobile to allow the driver or passenger a comfortable head and neck support. Specifically, members 21 and 22 shown in FIG. 8 are slightly angular to maintain a natural neck and spinal alignment during use.

The Price Patent is a device for supporting the head and neck. It is used among other places, for supporting the head and neck during travel. Specifically, an object of the invention as set forth in Column 1 beginning on Line 48 is to have a device with a surface having a generally concave shape with respect to a vertical axis of curvature corresponding approximately to the central vertebral axis of the neck; the concave shape is fashioned so that it has symmetrical left and fight halves, opposing areas of which are designed to exert gentle pressure in the vicinity of the mastoid processes of the head, a region near the base of the head, and located at the sides thereof almost at the rear."

The Kantor Patent is a head and neck support cushion. It is intended to be worn against a seat. It is also to be used against the shoulder blades and the lower portion of the neck. The device is horseshoe shaped and is primarily designed to support the neck but it does not go to the lower portion of the back.

The Fiore Patent is a cervical support pillow. Referring to Column 1 beginning on Line 35, the patent states that it "provides a flexible resilient pillow to support the cervical area of one using the pillow . . . " It is adapted to receive the back of the head of the user and to fit over the shoulders of the user. Referring to FIG. 14, what is illustrated is how the device could be used when a person is seated in a chair while wearing the pillow in its wraparound arrangement by leaning back to apply pressure on the cervical spine area. However, this does not talk about the support going back to the thoracic portion of the spine.

The Pujals, Jr. Patent discloses a cervical/occipital support. This is a semi-rigid neck brace which provides posterior and lateral support. The device really functions more as a brace rather than as a pillow.

The Liu Patent discloses a protective pillow which comprises two symmetrical side panels connected by a back panel which define a receiving space therein for the comfortable support of the head of a user. The back panel has a surface which fits the back of the head. The side panels have bottom ends which terminate into hooks by which the pillow can be fastened or attached to the user's shoulders.

The Festa Patent is a therapeutic cervical pillow. The device comprises a concave pillow member having a back portion having an arcuate surface and a pair of laterally opposing arcuate side portions extending from the back portion. The arcuate side portions the back portion arcuate surface define a concavity for accepting the neck of a person for supporting the cervical spine when in a seated position. However, it does not go to the thoracic portion of the spine.

The Connolly Patent is a cervical neck support for children. The cervical neck support is a rectangular configuration and is constructed of semi-rigid foam. It is designed to essentially support the neck of the child as illustrated in the pictures.

The Fidge Patent is a support device that extends upwardly from the user's shoulder to at least a portion of the user's ears. The support includes means for varying the size and shape of the cushion with an air bladder so that dimensions can be varied during use by the individual user and configured for use by many individuals. The device is selectively positionable adjacent a person's head, neck and shoulders such that it provides a comfortable support for the person's head and neck. However, it does not extend to the thoracic portion of the spine.

The Holste Patent is a head and neck support. This is a pillow to support an individual's head and neck while seated. It is generally donut-shaped and is probably something that is probably purchased at airports.

The Seppo Patent is a design patent which is a lumbar support.

The Cothren Patent is a design patent and is a sleep support device.

While most of the prior art patents deal with supporting a user's neck while the user is riding or resting in a vehicle, none of these patents address the issue of firmly supporting the user's neck while the user is asleep in a vehicle such as an airplane and wherein certain conditions as will be discussed below occur which result in neck pain. There is a significant need for a device which supports the user's neck in a manner that the user can comfortably sleep without experiencing any neck pain upon awakening.

SUMMARY OF THE INVENTION

The present invention relates to the concept of supporting the neck during the time a passenger is asleep while riding in a transportation vehicle such as an airplane, train or car.

When an individual is asleep in the seat of a vehicle, the muscles of the entire body, in general, and the spine in particular, are in full relaxation and his/her neck and head are left without support. Frequently, as people fall asleep during a ride, their head tends to lean to one side or the other, thereby creating strain of the ligaments of the neck which result in neck pain and stiffness in the neck, often associated with headaches.

The present invention is designed to provide an apparatus to support the curve of the posterior aspect of the upper and lower portion of the neck and upper thoracic portion of the spine and behind the ears to provide support to these areas so that the head and neck will remain in a supported position while the individual is asleep. The device also provides a residing area for the skull supporting the weight of the head posteriorly. The invention holds the spine in the ideal position during sleep. The device does not support the head and neck of a passenger when awake and holding his/her head and neck in the appropriate vertical position by the supporting contraction of the muscles. In such times, the passenger's head and neck area are completely free of any uncomfortable contact with the device. The device is not strapped to the neck and does not support the head or neck interiorly. When the passenger bends forward or stands up from his/her seat, the device drops behind the shoulder area over the upper thoracic, held in place by a loose strap similar to a "cowboy hat" strap. The device is mechanically effective only when passengers place it behind their neck, lean their seat backward for 10° and relax their head to rest on the device.

It has been discovered that by having the present invention which has a widened portion which fits immediately behind the lower portion of the occiput and the mastoid process behind the ears by laterally extending downward to a portion that supports the natural lordotic curvature of the neck, the device will therefore be designed to the same curve of the neck and then its lower portion which abuts against the upper thoracic portion of the spine with the entire design and configuration of the support device matching the curvature of the neck and upper thoracic portion of the spine, provides a very secure device to amply support the patient's head and neck while the patient is sleeping and to prevent having neck pain and headaches when the patient awakes due to a straining of the ligaments in the neck.

It has further been discovered that with the center portion of the device going right into the middle of the upper back between the shoulder blades to provide support as the individual is asleep, the device will not fall away from the individual and the trunk of the passenger would not lock the device posteriorly against the seat. Therefore, the device serves to support the neck in a manner so that there will be no strain on the ligaments while the passenger is asleep.

It has further been discovered that by having a post connecting the upper and lower segments of the neck portion of the device, this further serves to resist pressure. The post would transfer the resistance of the seat to the device, which in turn, will be pushed against the natural curve of the neck supporting the neck and head solidly in place.

It is therefore an object of the present invention to create a support device with a wide transversely curved area at the upper portion which rests immediately below the portion of the skull, that is below the occiput, where there are bony plates on either side behind the ears, known as the mastoid bones, and then having a central portion which is anteriorly and longitudinally curved to match the natural curve of the cervical spine and then a lower portion which rests against the thoracic spine and is supported against the thoracic spine between the shoulder blades so that the entire device supports the curve of the neck and the upper bony portions of the lower portion of the skull and behind the ears and between the shoulder blades and upper thoracic portion of the spine so that the device amply supports the head and neck while the patient is asleep.

It is a further object of the present invention to provide a support to the head and neck in an appropriate posture to prevent sustained tilt of the head and neck to one side and therefore, prevent the strain of the neck and its symptoms to occur.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
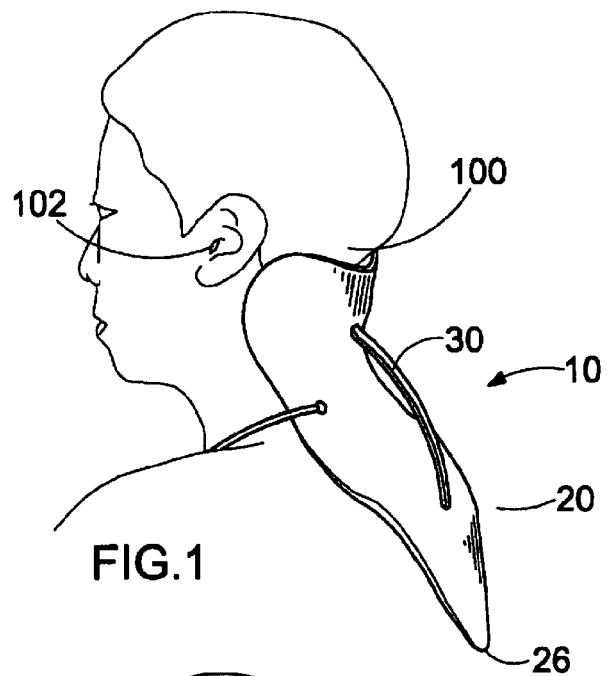
FIG. 1 is a perspective view of the present invention head and neck support device in place behind the lower portion of a user's head and behind the user's neck while the user is asleep in a vehicle.
Figure 2:
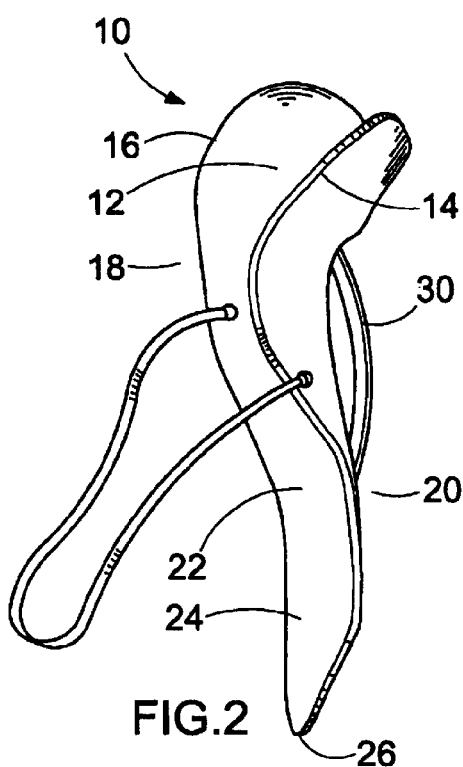
FIG. 2 is a perspective view of the present invention head and neck support device, viewed from the left side of the device.
Figure 3:
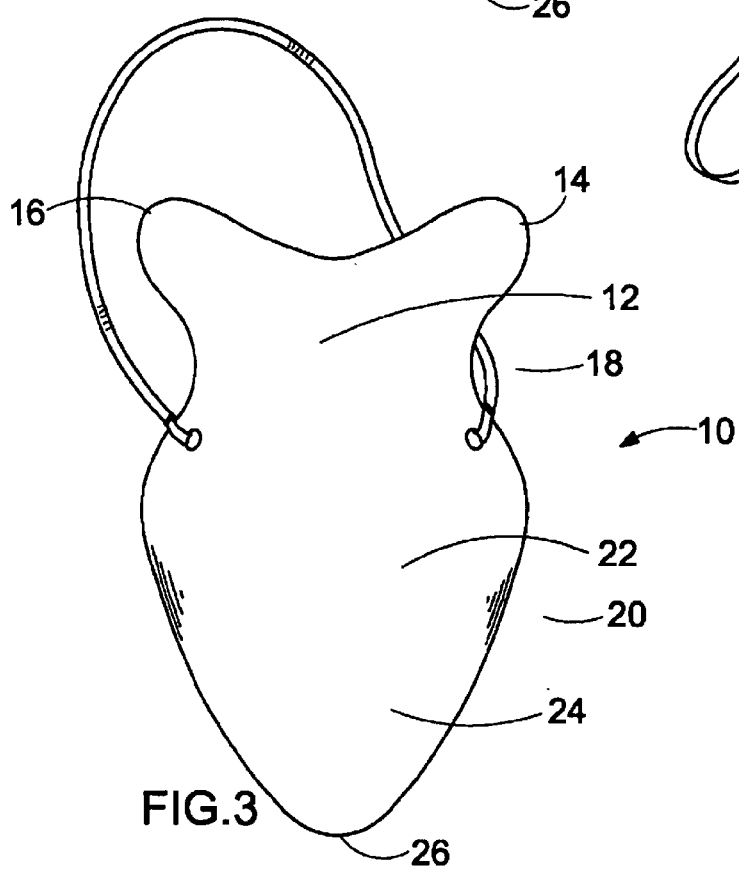
FIG. 3 is a front elevational view of the present invention head and neck support device.
Figure 4:
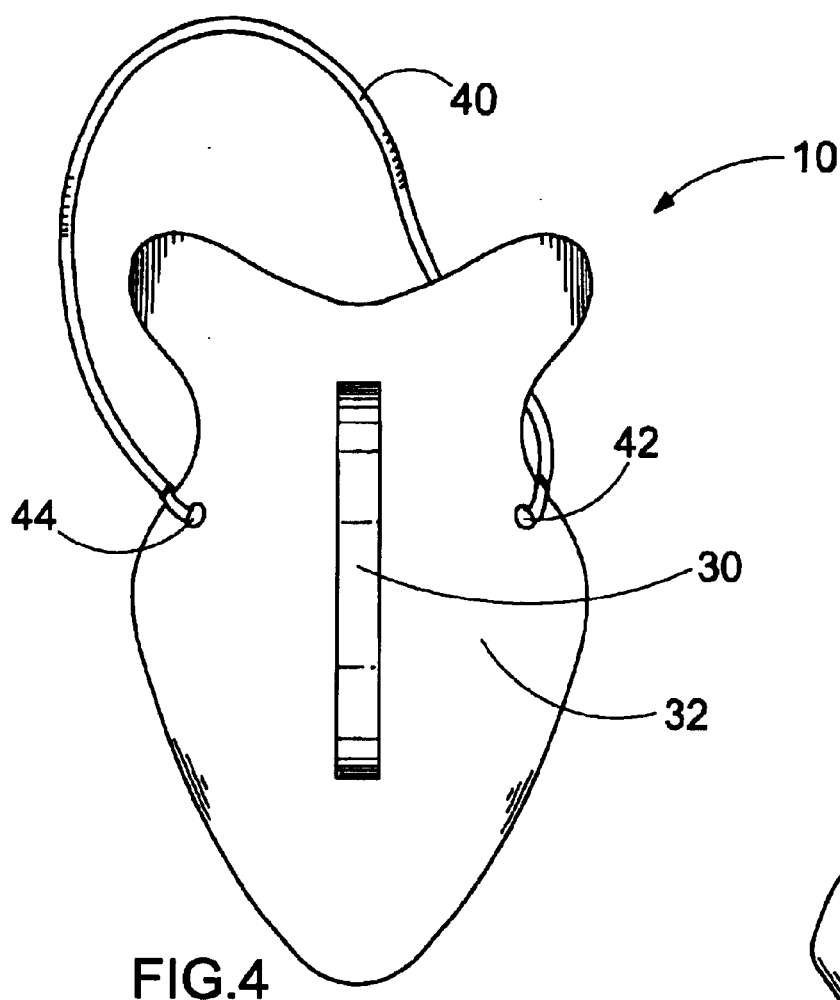
FIG. 4 is a rear elevational view of the present invention head and neck support device.
Figure 5:
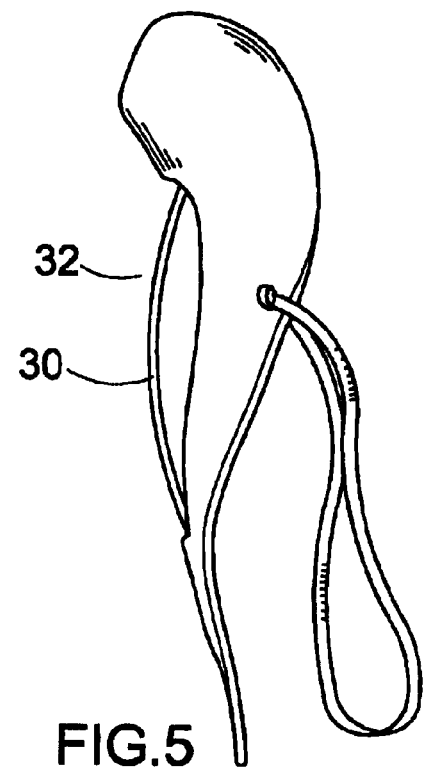
FIG. 5 is a side elevational view of the present invention head and neck support device as viewed from the right side.

Referring particularly to the perspective view of the present invention as illustrated in FIG. 2 and the in use perspective view of the present invention as illustrated in FIG. 1, as well as FIGS. 3 and 4, the present head and neck support device is illustrated at 10. The structure of the device 10 is made out of one piece construction and is formed with the following components. The upper portion of the device 10 has oppositely disposed curved and widened portions which fit immediately behind the lower portion of the occiput and the mastoid processes behind the ears. The upper portion of the device 10 is composed of a center section 12 which has a backwardly extending curve as best shown in FIG. 2 and is surrounded by a left widened portion 14 to one side of the center section 12 and a symmetrical right widened portion 16 at the opposite side of the center section 12. As illustrated in FIG. 1, the center section 12 fits behind the lower portion of the user's head 100 with its backwardly extending curve matching the curve of the lower back portion of the user's head, with the left widened portion 14 and the right widened portion 16 respectively fitting behind the left ear 102 and the right ear (not shown) so that the left widened portion 14, center section 12 and right widened portion 16 fit immediately behind the lower portion of the occiput and the mastoid processes.

As illustrated in FIGS. 2 and 3, the left widened portion 14 and the right widened portion 16 curve inwardly toward each other and toward center section 12 as they extend downwardly on the device 10 while the center section 12 curves forwardly in a generally convex design to form the neck area 18, which curves are formed to support the natural lordotic curvature of the neck. The device is therefore designed to the same curvature as the neck in the area where the device is immediately behind the neck as illustrated in FIGS. 1 and 2. The device 10 extends to a lower section 20 which as illustrated in FIGS. 2 and 3 has a slightly concave central portion 22 and a generally flat lower area 24 ending in a central lower tip 26. The curvature of the lower section 20 including the concave central portion 22 and generally flat lower area 24 are designed so that they abut against the upper thoracic portion of the spine. The center lower tip 26 goes right into the middle of the upper back between the shoulder blades as illustrated in FIG. 1. The lower section 20 and its components are designed to match the curvature of the upper thoracic portion of the spine.

Therefore, the device 10 is designed to the same curve of the neck and then its lower portion which abuts against the upper thoracic portion of the spine with the entire design and configuration of the support device matching the curvature of the neck and the upper thoracic portion of the spine. The lower center portion 20 goes right into the middle of the upper back between the shoulder blades to provide the support so that, as the individual is asleep, the device will not fall away from the individual and the trunk of the passenger would lock the device posteriorly against the seat.

Referring to FIGS. 1, 2, 4 and 5, there is a post 30 on the rear portion 32 of the device 10, which post 30 connects upper section 12 and lower section 20. The post is resistant to pressure. The post 30 is designed to transfer the resistance of the seat against which the passenger is resting his head to the device 10 which in turn would be pushed against the natural curve of the neck supporting the neck and head solidly in place. The post 30 can be molded as part of the one piece structure of the device 10 or it can be a separate piece which is affixed to the back 32 of the device 10 in the manner illustrated in FIGS. 1, 2, 4 and 5.

Therefore, the concept of the present invention is to create a support device 10 with a wide transversely curved area 12, 14 and 16 at the upper portion which rests immediately below the portion of the skull, that is below the occiput, where there are bony plates on either side behind the ears, known as the mastoid bones, and then having a central portion 18 which is anteriorly and longitudinally curved to match the natural curve of the cervical spine and then a lower portion 20 and its components 22, 24 and 26 which rests against the thoracic spine and is supported against the thoracic spine between the shoulder blades so that the entire device 10 supports the curve of the neck and the upper bony portions of the lower portion of the skull and behind the ears and between the shoulder blades and upper thoracic portion of the spine so that the device amply supports the head and neck while the user is asleep. The device, by supporting the head and neck in appropriate posture prevents the sustained tilt of the head and neck to one side and, as a result, prevents the strain of the neck and its symptoms to occur.

A loose strap 40 is attached at locations 42 and 44 of the device and extends forwardly in front of the device. The strap is placed over the wearer's head so that it rests on the wearer's shoulder. The strap 40 is not intended to strap the device 10 to the user's neck but is instead intended as a retaining device so that if the user bends forward or stands up from his or her seat, the strap will enable the device 10 to drop behind the user's shoulder area over the upper thoracic area and held in place by the loose strap so that it will not fall off and be lost.

The device is mechanically most effective when the user places it behind the user's neck as discussed above and then the user leans his/her seat backward for ten degrees and relaxes the head to rest on the device while the user falls asleep.

The device provides a secure support to the user while the user is asleep during the ride in the vehicle so that it will prevent the head from leaning to one side or the other and thereby prevent the strain on the ligaments of the neck which would result when the user is asleep and does bend his head to one side or the other, thereby eliminating neck pain and stiffness in the neck which often creates headaches.

Defined in detail, the present invention is a device for supporting the head and neck of a user while the user is asleep in the seat of a vehicle, the user having a lower back part of a head known as the occiput which extends to the user's cervical spine having a lordotic curve and which further extends to the user's thoracic spine, the user also having ears with a mastoid bone behind each respective ear and the user having an upper thoracic back and shoulder blades, the device comprising: (a) a front surface and a rear surface, and an upper portion including a front center section which has a backwardly extending curve and surrounded by a front left widened portion to one side of the front center section and a symmetrical front right widened portion at the opposite side of the front center section, the front center section fitting behind the lower back part of the user's head and curved to match the occiput, the front left widened portion and the front right widened portion respectively fitting behind the user's left and right ears so that the front left widened portion is designed to match the mastoid bone behind the left ear and the front right widened portion is designed to match the right mastoid bone behind the right ear; (b) a front neck portion in which the front left widened portion and the front right widened portion curve inwardly toward each other as they extend downwardly on the device while the front center section curves forwardly in a convex shape between the inwardly curving front left and right widened portions, the front neck portion designed to support the lordotic curve of the user's cervical spine; (c) a front lower section having a concave central portion extending below the front convex center section of the front neck portion and a front flat lower area extending below the concave center portion and extending to the left and right side of the first lower section, the first lower section designed to abut against the upper thoracic portion of the user's spine, the device terminating in a front lower central tip which is designed to fit behind the middle of the user's back between the user's shoulder blades; (d) a rear post extending from the rear surface of the upper center section to the rear surface of the lower center section; and (e) a strap attached to the device.

Defined broadly, the present invention is device for supporting the head and neck of a user while the user is asleep in the seat of a vehicle, the user having a lower back part of a head known as the occiput which extends to the user's cervical spine having a lordotic curve and which further extends to the user's thoracic spine, the user also having ears with a mastoid bone behind each respective ear and the user having an upper thoracic back and shoulder blades, the device comprising: (a) a front surface and a rear surface, and an upper portion including a front center section which has a backwardly extending curve and surrounded by a front left widened portion to one side of the front center section and a symmetrical front right widened portion at the opposite side of the front center section, the front center section fitting behind the lower back part of the user's head and curved to match the occiput, the front left widened portion and the front right widened portion respectively fitting behind the user's left and right ears so that the front left widened portion is designed to match the mastoid bone behind the left ear and the front right widened portion is designed to match the right mastoid bone behind the right ear; (b) a front neck portion in which the front left widened portion and the front right widened portion curve inwardly toward each other as they extend downwardly on the device while the front center section curves forwardly in a convex shape between the inwardly curving front left and right widened portions, the front neck portion designed to support the lordotic curve of the user's cervical spine; (c) a front lower section having a concave central portion extending below the front convex center section of the front neck portion and a front flat lower area extending below the concave center portion and extending to the left and right side of the first lower section, the first lower section designed to abut against the upper thoracic portion of the user's spine, the device terminating in a front lower central tip which is designed to fit behind the middle of the user's back between the user's shoulder blades; and (d) a rear post extending from the rear surface of the upper center section to the rear surface of the lower center section.

Defined more broadly, the present invention is a device for supporting the head and neck of a user while the user is asleep in the seat of a vehicle, the user having a lower back part of a head known as the occiput which extends to the user's cervical spine having a lordotic curve and which further extends to the user's thoracic spine, the user also having ears with a mastoid bone behind each respective ear and the user having an upper thoracic back and shoulder blades, the device comprising: (a) a front surface and a rear surface, and an upper portion including a front center section which has a backwardly extending curve and surrounded by a front left widened portion to one side of the front center section and a symmetrical front right widened portion at the opposite side of the front center section, the front center section fitting behind the lower back part of the user's head and curved to match the occiput, the front left widened portion and the front right widened portion respectively fitting behind the user's left and right ears so that the front left widened portion is designed to match the mastoid bone behind the left ear and the front right widened portion is designed to match the right mastoid bone behind the right ear; (b) a front neck portion in which the front left widened portion and the front right widened portion curve inwardly toward each other as they extend downwardly on the device while the front center section curves forwardly in a convex shape between the inwardly curving front left and right widened portions, the front neck portion designed to support the lordotic curve of the user's cervical spine; and (c) a front lower section having a concave central portion extending below the front convex center section of the front neck portion and a front flat lower area extending below the concave center portion and extending to the left and right side of the first lower section, the first lower section designed to abut against the upper thoracic portion of the user's spine, the device terminating in a front lower central tip which is designed to fit behind the middle of the user's back between the user's shoulder blades.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A device for supporting the head and neck of a user while the user is asleep in the seat of a vehicle, the user having a lower back part of a head known as the occiput which extends to the user's cervical spine having a lordotic curve and which further extends to the user's thoracic spine, the user also having ears with a mastoid bone behind each respective ear and the user having an upper thoracic back and shoulder blades, the device comprising:

a. a front surface and a rear surface, and an upper portion including a front center section which has a backwardly extending curve and surrounded by a front left widened portion to one side of the front center section and a symmetrical front right widened portion at the opposite side of the front center section, the front center section fitting behind the lower back part of the user's head and curved to match the occiput, the front left widened portion and the front right widened portion respectively fitting behind the user's left and right ears so that the front left widened portion is designed to match the mastoid bone behind the left ear and the front right widened portion is designed to match the right mastoid bone behind the right ear;

b. a front neck portion in which the front left widened portion and the front right widened portion curve inwardly toward each other as they extend downwardly on the device while the front center section curves forwardly in a convex shape between the inwardly curving front left and right widened portions, the front neck portion designed to support the lordotic curve of the user's cervical spine;

c. a front lower section having a concave central portion extending below the front convex center section of the front neck portion and a front flat lower area extending below the concave center portion and extending to the left and right side of the first lower section, the first lower section designed to abut against the upper thoracic portion of the user's spine, the device terminating in a front lower central tip which is designed to fit behind the middle of the user's back between the user's shoulder blades;

d. a rear post extending from the rear surface of the upper center section to the rear surface of the lower center section; and e. a strap attached to the device.

2. The device in accordance with claim 1, wherein the device is manufactured out of molded plastic.

3. A device for supporting the head and neck of a user while the user is asleep in the seat of a vehicle, the user having a lower back part of a head known as the occiput which extends to the user's cervical spine having a lordotic curve and which further extends to the user's thoracic spine, the user also having ears with a mastoid bone behind each respective ear and the user having an upper thoracic back and shoulder blades, the device comprising:

a. a front surface and a rear surface, and an upper portion including a front center section which has a backwardly extending curve and surrounded by a front left widened portion to one side of the front center section and a symmetrical front right widened portion at the opposite side of the front center section, the front center section fitting behind the lower back part of the user's head and curved to match the occiput, the front left widened portion and the front right widened portion respectively fitting behind the user's left and right ears so that the front left widened portion is designed to match the mastoid bone behind the left ear and the front right widened portion is designed to match the right mastoid bone behind the right ear;

b. a front neck portion in which the front left widened portion and the front right widened portion curve inwardly toward each other as they extend downwardly on the device while the front center section curves forwardly in a convex shape between the inwardly curving front left and right widened portions, the front neck portion designed to support the lordotic curve of the user's cervical spine;

c. a front lower section having a concave central portion extending below the front convex center section of the front neck portion and a front flat lower area extending below the concave center portion and extending to the left and right side of the first lower section, the first lower section designed to abut against the upper thoracic portion of the user's spine, the device terminating in a front lower central tip which is designed to fit behind the middle of the user's back between the user's shoulder blades; and d. a rear post extending from the rear surface of the upper center section to the rear surface of the lower center section.

4. The device in accordance with claim 3, wherein the device is manufactured out of molded plastic.

5. A device for supporting the head and neck of a user while the user is asleep in the seat of a vehicle, the user having a lower back part of a head known as the occiput which extends to the user's cervical spine having a lordotic curve and which further extends to the user's thoracic spine, the user also having ears with a mastoid bone behind each respective ear and the user having an upper thoracic back and shoulder blades, the device comprising:

a. a front surface and a rear surface, and an upper portion including a front center section which has a backwardly extending curve and surrounded by a front left widened portion to one side of the front center section and a symmetrical front right widened portion at the opposite side of the front center section, the front center section fitting behind the lower back part of the user's head and curved to match the occiput, the front left widened portion and the front right widened portion respectively fitting behind the user's left and right ears so that the front left widened portion is designed to match the mastoid bone behind the left ear and the front right widened portion is designed to match the right mastoid bone behind the right ear;

b. a front neck portion in which the front left widened portion and the front right widened portion curve inwardly toward each other as they extend downwardly on the device while the front center section curves forwardly in a convex shape between the inwardly curving front left and right widened portions, the front neck portion designed to support the lordotic curve of the user's cervical spine; and c. a front lower section having a concave central portion extending below the front convex center section of the front neck portion and a front flat lower area extending below the concave center portion and extending to the left and right side of the first lower section, the first lower section designed to abut against the upper thoracic portion of the user's spine, the device terminating in a front lower central tip which is designed to fit behind the middle of the user's back between the user's shoulder blades.

6. The device in accordance with claim 5, also further comprising a rear post extending from the rear surface of the upper center section to the rear surface of the lower center section.

7. The device in accordance with claim 5, also comprising a strap attached to the device.

* * * * *